United States Patent [19]

Liu et al.

[11] 4,358,696
[45] Nov. 9, 1982

[54] PERMANENT MAGNET SYNCHRONOUS MOTOR ROTOR

[75] Inventors: Joseph C. Liu, Little Rock, Ark.; Paul D. Wagner, Cincinnati, Ohio; John J. Keuper, Cold Spring, Ky.

[73] Assignee: Siemens-Allis, Inc., Atlanta, Ga.

[21] Appl. No.: 294,284

[22] Filed: Aug. 19, 1981

[51] Int. Cl.³ .................................... H02K 21/12
[52] U.S. Cl. ................................ 310/156; 310/261
[58] Field of Search ............... 310/156, 162, 211, 261

[56] References Cited

U.S. PATENT DOCUMENTS

| | | | |
|---|---|---|---|
| 2,418,980 | 4/1947 | Morrill | 310/156 |
| 3,492,520 | 1/1970 | Yates | 310/162 X |
| 4,139,990 | 2/1979 | Steen | 310/156 |

*Primary Examiner*—Donovan F. Duggan
*Attorney, Agent, or Firm*—F. W. Powers, III

[57] ABSTRACT

A permanent magnet rotor configuration which produces four magnetic poles utilizing two sets of symmetrically-disposed permanent magnets. The slots carrying the magnets exhibit a truncated V-shaped configuration, extending from points on the periphery of the rotor to meet the ends of a straight, central portion which lies parallel to a tangent to the rotor shaft. A short magnetic bridge interrupts the center of each slot, the slots being disposed generally symmetrically upon opposite sides of the rotor shaft.

6 Claims, 2 Drawing Figures

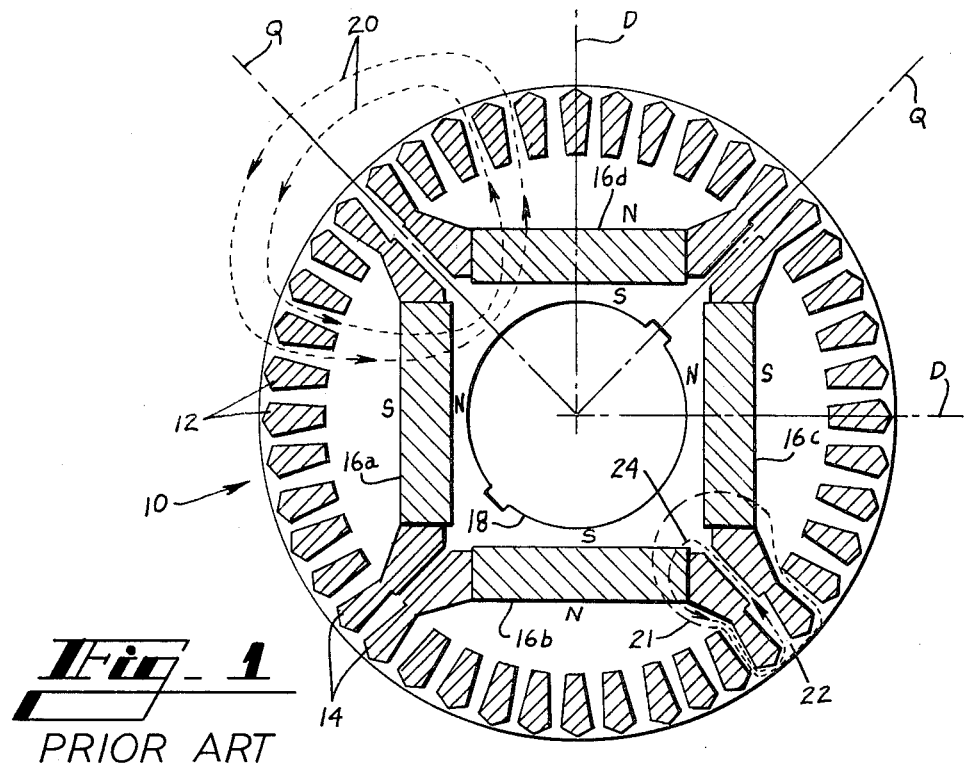
Fig_1
PRIOR ART
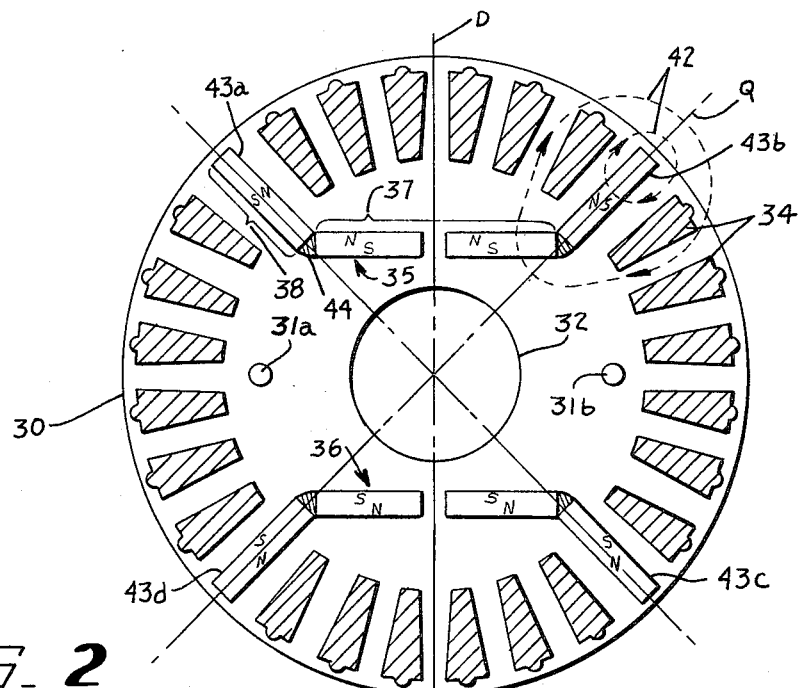
Fig_2

PERMANENT MAGNET SYNCHRONOUS MOTOR ROTOR

BACKGROUND OF THE INVENTION

This invention relates to permanent magnet synchronous motors, and more specifically to an improved rotor construction therefor.

The synchronous operation of relatively small-diameter motors is required in some applications, for example the textile industry where it is necessary for a large number of motors to operate in precise synchronism. While in principle the construction of synchronous motors has long been known it is difficult and relatively expensive to construct small synchronous machines by heretofore conventional tenchiques—for instance, by providing salient poles with individual windings. Moreover, the high speeds required of such machines make a segmented or wire-wound rotor construction impractical.

In one approach to providing a rugged rotor which exhibits synchronous characteristics, induction motor rotors have been provided with flux barriers. In this manner the magnetic reluctance of the rotor is caused to vary with rotor orientation, which in turn causes the rotor to tend to "follow" the rotating magnetic field produced by the stator windings. This type of motor, termed a synchronous reluctance motor, is exemplified by U.S. Pat. Nos. 3,862,466—Hilgeman et al and 3,652,885—Honsinger. The flux barriers of these motors are provided by axial slots extending through the rotor laminations, which are filled with a nonmagnetic material such as cast aluminum. In addition, the motors are typically provided with a set of axial rotor bar slots about the peripheries thereof much in the manner of ordinary induction motors.

With the availability of high-strength permanent magnets, the cast flux barriers were partially replaced with magnets. The magnets served to produce magnetic poles in the rotor which interacted with stator flux to achieve synchronous motor operation. In effect, the permanent magnets take the place of electromagnetic windings of conventional synchronous motors. One example of such a construction is disclosed in U.S. Pat. No. 4,139,790—Steen.

The construction of rotors using permanent magnets to achieve synchronous operation is not without difficulty, however. Due to the high speeds encountered, the mechanical strength of the rotor laminations is of considerable importance and must be maintained. Further, pre-formed permanent magnets commonly are produced in the shape of rectangular bars which must be pressed into the rotor body, giving rise to exacting mechanical design considerations. Still further, the rare earth magnets which are commonly used in such rotors are very expensive which makes it desirable to limit the volume of magnetic material. At the same time it is desirable to provide the maximum magnetic area possible in order to produce strong magnetic poles. Finally, it is desirable to achieve all of these criteria while using magnets of a single, common size and shape.

It will therefore be appreciated that it would be highly desirable to provide an improved four-pole permanent magnet motor rotor which is mechanically strong, optimizes the use of magnetic material, and exhibits better performance characteristics than those previously known.

Accordingly, it is an object of the invention to provide an improved rotor for a permanent magnet motor.

Another object is to provide an economical permanent magnet rotor which exhibits improved performance characteristics.

Yet another object is to provide a four-pole permanent magnet rotor requiring less magnetic material than hereinbefore, yet with no degradation in performance.

Another object is to construct an improved four-pole permanent magnet motor utilizing only magnets of a single size and shape.

SUMMARY OF THE INVENTION

Briefly stated, in accordance with one aspect of the invention the foregoing objects are achieved by providing a plurality of laminations which are stacked together to form a rotor body. The laminations are provided with openings which align with one another to define openings ("slots") extending axially through the rotor body. A central, circular opening through the laminations receives the rotor shaft. A first set of slots are disposed in an arc around the periphery of the rotor body for receiving induction rotor bars. A pair of narrow, elongate slots are also provided for receiving permanent magnets. The slots are disposed symmetrically upon opposite sides of the rotor shaft opening in a truncated V configuration and comprise straight central portions which are parallel to one another, and end portions which extend generally along radii of the rotor body. The central slot portions are interrupted by magnetic bridges formed integrally with the laminations, while the end portions of the magnet slots are interleaved among the rotor bar slots. In a preferred embodiment gaps between the magnets are filled with cast aluminum.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 is a sectional view of a rotor body constructed in accordance with the prior art; and FIG. 2 is a sectional view of an improved rotor body constructed in accordance with the present invention.

DESCRIPTION OF A PREFERRED EMBODIMENT

In a rotor body constructed in accordance with the prior art and generally indicated at 10, the body is formed of a plurality of magnetic laminations which are stacked to form a cylinder. Cutouts in the laminations thus align to form axially-directed openings, generally referred to as slots. A first set of openings 12 are formed about the periphery of the rotor body in accordance with standard induction motor principles and are filled with a conductive metal such as aluminum to form squirrel cage rotor bars. The array of rotor bars is periodically interrupted by barriers 14. The outer ends of the barriers, which are formed from conductive material such as aluminum, serve as rotor bars but the principal purpose of the barriers is to direct magnetic flux as will be described hereinafter.

The flux produced in rotor body 10 is derived from four permanent magnets 16a–16d, which are disposed in a square as shown. The magnets are oriented symmetrically about an opening 18, which receives the rotor shaft upon which the rotor body is journaled. As set forth in U.S. Pat. No. 4,139,790 magnets 16a-16d are magnetized in a generally outward direction in order to establish inwardly and outwardly disposed north and south poles. By alternating the polarities of adjacent magnets in the manner shown, lines of flux 20 are generated which in turn establish a 4-pole configuration. As is well known to those skilled in the art, nonmagnetic materials such as aluminum barriers 14 have a very low degree of permeability and hence the magnetic lines of flux are forced to extend outwardly of the rotor body, rather than being short circuited by the magnetic material of the body. Inevitably a few lines of flux such as lines 21 will flow within the rotor but by extending barriers 14 near the rotor periphery the magnetic paths for such flux leakage are minimized. The narrow magnetic paths about the barriers are saturated by the flux, however, and do not substantially detract from the rotor flux which crosses the motor air gap.

The portion of each lamination lying radially within magnets 16a-16d is mechanically connected to the portions outside the magnets by the integral ribs 22 which extend between barriers 14. In order to prevent lines of flux from being short-circuited within the body structure, as exempled by flux line 24, the amount of rotor material lying radially outside of each barrier, and the width of the rib 22, must be held to a minimum. At the same time, the ribs must be strong enough to resist high centrifugal forces and must be substantial enough to resist damage during the manufacturing and assembly process. Ribs 22 are oriented 90 electrical degrees from mangets 16a-16d and lie along the quadrature axes Q of the motor stator field.

While the general approach illustrated in FIG. 1 produces a workable permanent magnet motor, in practice some deficiencies have been noted. For example, despite the fact that a substantial volume of magnetic material is utilized, the actual magnetic area per pole is relatively low. Further, the cost of the four relatively large magnets is undesirably high, particularly when rare earth magnets are utilized. In addition the rather long, thin reinforcing ribs 22 are susceptible of damage during the manufacturing process, particularly in the handling of unstacked laminations, and to some degree detract from the mechanical strength of the rotor body as a whole.

Turning now to FIG. 2, there is shown an improved rotor configuration utilizing less magnetic material than the prior art design shown in FIG. 1, yet exhibiting superior performance characteristics. In particular, a rotor body 30 is formed of a stack of aligned laminations in a conventional fashion and secured by rivets extending through holes 31a and 31b. The laminations each contain a central opening 32 which receives a shaft upon which the rotor is mounted. A plurality of slots 34 are disposed about the periphery of the rotor body in an arcuate locus so as to provide slots within which induction rotor bars can be formed. The permanent magnets which define the magnetic poles of the rotor are disposed in two, rather than four, sets of slots 35, 36 which are oriented 180° within the rotor body.

For purposes of description each set of magnets may be considered to be confined within an elongate slot, each slot being disposed symmetrically at opposite sides of the rotor shaft opening and formed in the shape of a truncated "V". Each set of magnet slots has a central portion generally indicated at 37 which extends parallel to a line lying tangent to the shaft opening 32. Further, each elongate slot has an end portion 38 inclined at an angle to the central portion 37 so that it extends generally along a radius of the rotor body, preferably coincident with one of the Q axes. The end portions 38 of the magnet slots extend generally into the array of rotor bar slots 34, close to the outer periphery of the rotor body so as to leave as small a magnetic path as possible about each end of the slot. The end portions extend further inwardly than do rotor bar slots 34 so as to meet the central portion 37 of the slot. Further, the central portion 37 of each slot is interrupted by a magnetic bridge 40, which is formed integrally with each lamination so as to mechanically connect the portion of each lamination which is radially outside the elongate slot with the "inner" portion of the lamination lying between the two elongate magnet slots.

In a preferred embodiment each elongate slot is filled with four relatively thin, preformed permanent magnets of the rare earth variety. The magnets are of a single, common size and shape and are magnetized transversely as shown so that magnets in confronting sides of each slot have similar poles. This gives rise to a symmetrical flux pattern partially illustrated by flux lines 42, producing four magnetic poles about the rotor body. Magnets utilizing materials such as samarium cobalt (SmCo5) are preferred in the illustrated embodiment. Such magnets exhibit a very high coercive force, so that the magnets can only be demagnetized by extremely high operating temperatures, on the order of 200° celsius, or by extremely high external magnetic fields which ordinarily result only from accidental overvoltage conditions. The magnets are ordinarily sintered and pressed into a flat, rectangular cross-section product which while quite dense is rather brittle and subject to damage unless skillfully handled. Alnico-type magnets may also be used although they have the disadvantage of a relatively low coercivity compared to ferrite and samarium cobalt magnets. At the same time rare-earth magnets cost considerably more than other, similar permanent magnets so that to be economically feasible they require a rotor design which makes optimum use of the volume of magnetic material.

Rather than provide an inert flux barrier in the radially-extending end portions of each slot, additional magnets 43a-43d are inserted in those portions, as shown. Although this adds to the total magnetic material in the rotor body and thus to the cost of the assembly the present inventors have found that with the illustrated design only two, rather than four, elongate magnet slots are required to produce satisfactory motor operation.

The midpoint of the central slot portion 37 lies upon a direct axis D of the motor stator while the magnets in end slot portion 38 lie along the Q axes, as shown. Voids 44 between adjacent magnets, which occur where the central and end portions of the slots intersect, are filled with nonmagnetic metal to prevent any motion or vibration of the magnets. In a preferred embodiment the rotor bars and magnet slot filling metal is cast aluminum, which is injected into the rotor body in a single casting process.

In order to evaluate the characteristics of the rotor body shown in FIG. 2, a commercially-available motor constructed according to FIG. 1. The characteristics and performance of the two rotors when operated in stators with a line power of 60 Hz and 230 volts is set forth below in Table I.

TABLE I

| Characteristic | Prototype (FIG. 2) | Prior Art (FIG. 1) |
| --- | --- | --- |
| Rotor $D^2L$ | 44.4 in.$^3$ | 31.4 in.$^3$ |
| Magnet area/Pole | 4.43 in.$^2$ | 2.82 in.$^2$ |
| Volume/Pole | .656 in.$^3$ | .846 in.$^3$ |
| Full Load Torque | 2.919 ft-lb | 2.137 ft-lb |
| Pull Out Torque | 165% | 150% |
| Full Load Current | 2.41 amps | 2.01 amps |
| Power-Down Factor (P.F.) | 94.2% | 91.3% |
| Efficiency | 82.5% | 74.9% |
| P.F. × Efficiency | .777 | .684 |
| Pull-in Torque @ 1.29 lb.-ft.$^2$ | 1.38 ft-lb | .26 ft-lb |

It will be noted that the first characteristic, $D^2L$, which is a measure of rotor volume, is approximately 41% greater for the inventive design; while the actual magnet area per pole is approximately 57% greater. At the same time, the actual volume of magnet material per pole is substantially less with the prototype. The inventive design produces substantially more torque, and both the pull-in and pull-out torque is greater than with the prior art approach.

Still other advantages inhere in the inventive design of FIG. 2. Because a lesser magnetic volume is used and the magnets may be thinner, a considerable cost saving is accomplished. Additionally, as only two, rather than four, segments of the rotor are intercepted by the magnet slots, the rotor body is considerably stronger. Further, the outer magnetic area of the rotor which is intercepted by the magnet slots is coupled to the inner portion of the rotor body by short, centrally located magnetic bridges 40 which are less susceptible to bending and breakage during manufacturing operations, and considerably stronger, than the long narrow bridges of FIG. 1.

It will now be appreciated that the present invention results in an improved permanent magnet motor rotor which has improved mechanical strength characteristics while using less magnetic material and exhibiting improved performance characteristics. As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A four-pole rotor for a permanent magnet synchronous motor comprising:
    a plurality of magnetic laminations aligned to form a rotor body, said laminations having openings which align to define
    (i) a set of rotor bar slots disposed in an arc about the periphery of the rotor body;
    (ii) a central opening extending axially through said rotor body to define a shaft opening; and
    (iii) first and second sets of elongae slots disposed symmetrically upon opposite sides of said rotor shaft opening, each elongate slot having a central portion extending parallel to a line tangent to said shaft opening and end portions extending generally along radii of the rotor body and interleaved generally aligned with said rotor bar slots;
    said central portions of said elongate slots lying parallel to one another and being interrupted by a magnetic bridge extending substantially in the center thereof, each of said bridges being integrally formed with said laminations; and
    a plurality of rare earth permanent magnets disposed in said central and end portions of said elongate slots.

2. A rotor according to claim 1 wherein said magnets exhibit a generally rectangular cross section, forming interstices between magnets in said central and said end portions of said elongate slots, and non-magnetic metal disposed in said interstices and in said rotor bar slots.

3. A rotor according to claim 2 wherein said magnets are all of the same size.

4. A rotor according to claim 1, wherein said end portions of said elongate slots are disposed substantially 90° apart.

5. A rotor according to claim 1, wherein said end portions of said elongate slots exhibit a dimension in a radial direction which is longer than the radial depth of said rotor bar slots.

6. A rotor according to claim 1, wherein all of said magnets are of a single, common size.

* * * * *